Dec. 24, 1940.  C. G. TURNER  2,226,084
DOUGH WORKING, CONVEYING, AND CUTTING TABLE
Filed Feb. 8, 1939  3 Sheets-Sheet 2
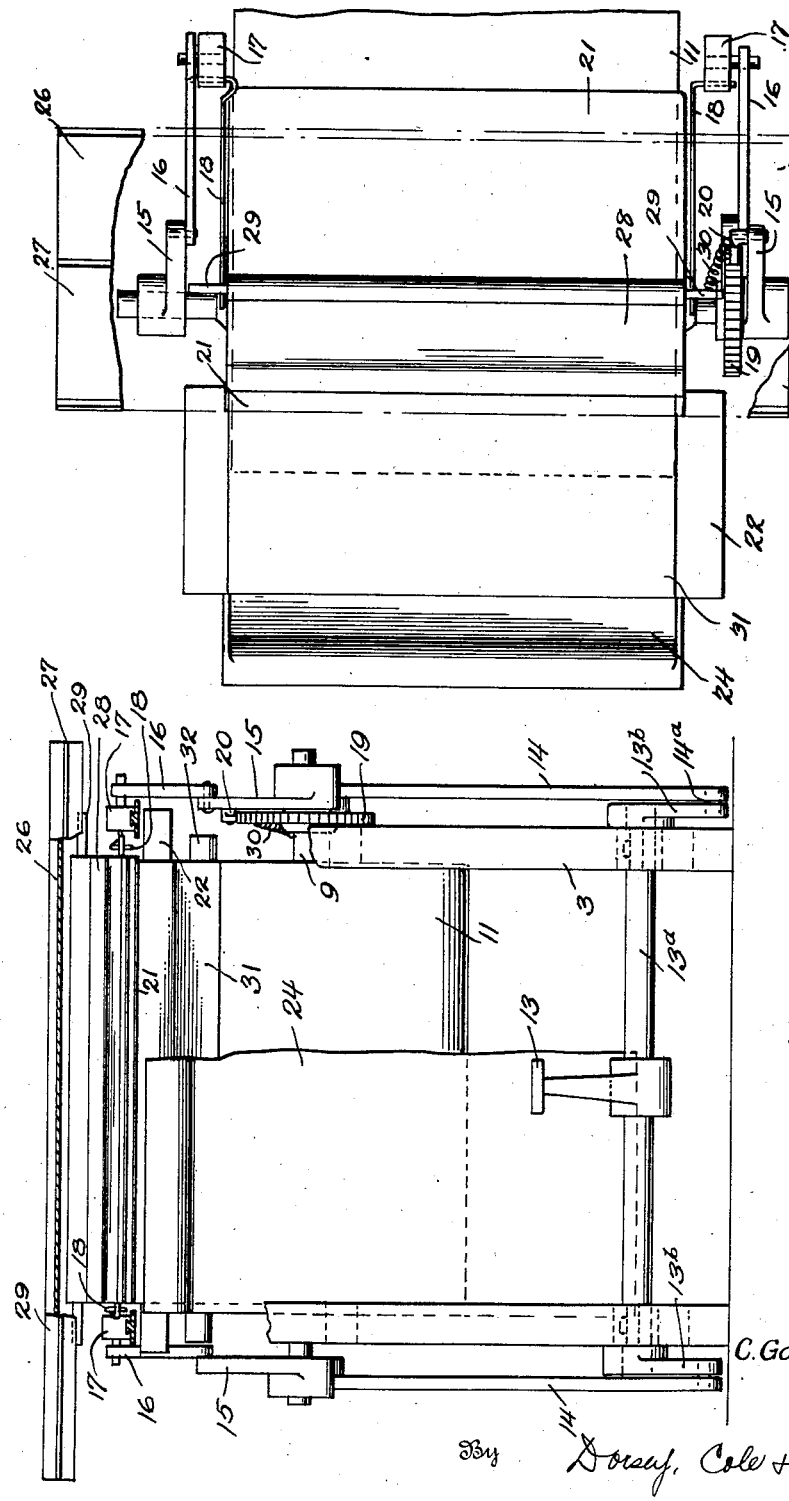

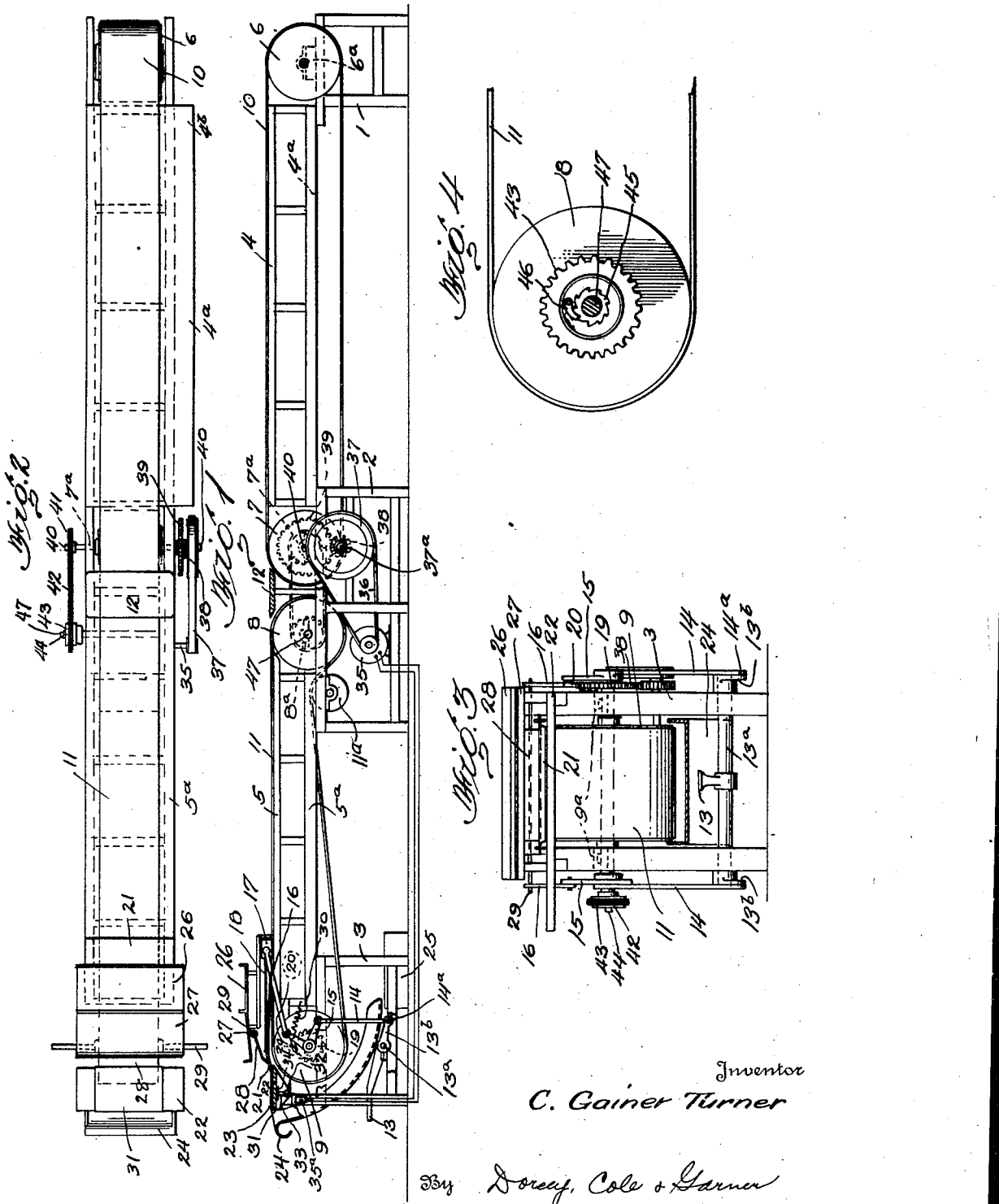

Dec. 24, 1940.  C. G. TURNER  2,226,084
DOUGH WORKING, CONVEYING, AND CUTTING TABLE
Filed Feb. 8, 1939  3 Sheets-Sheet 3
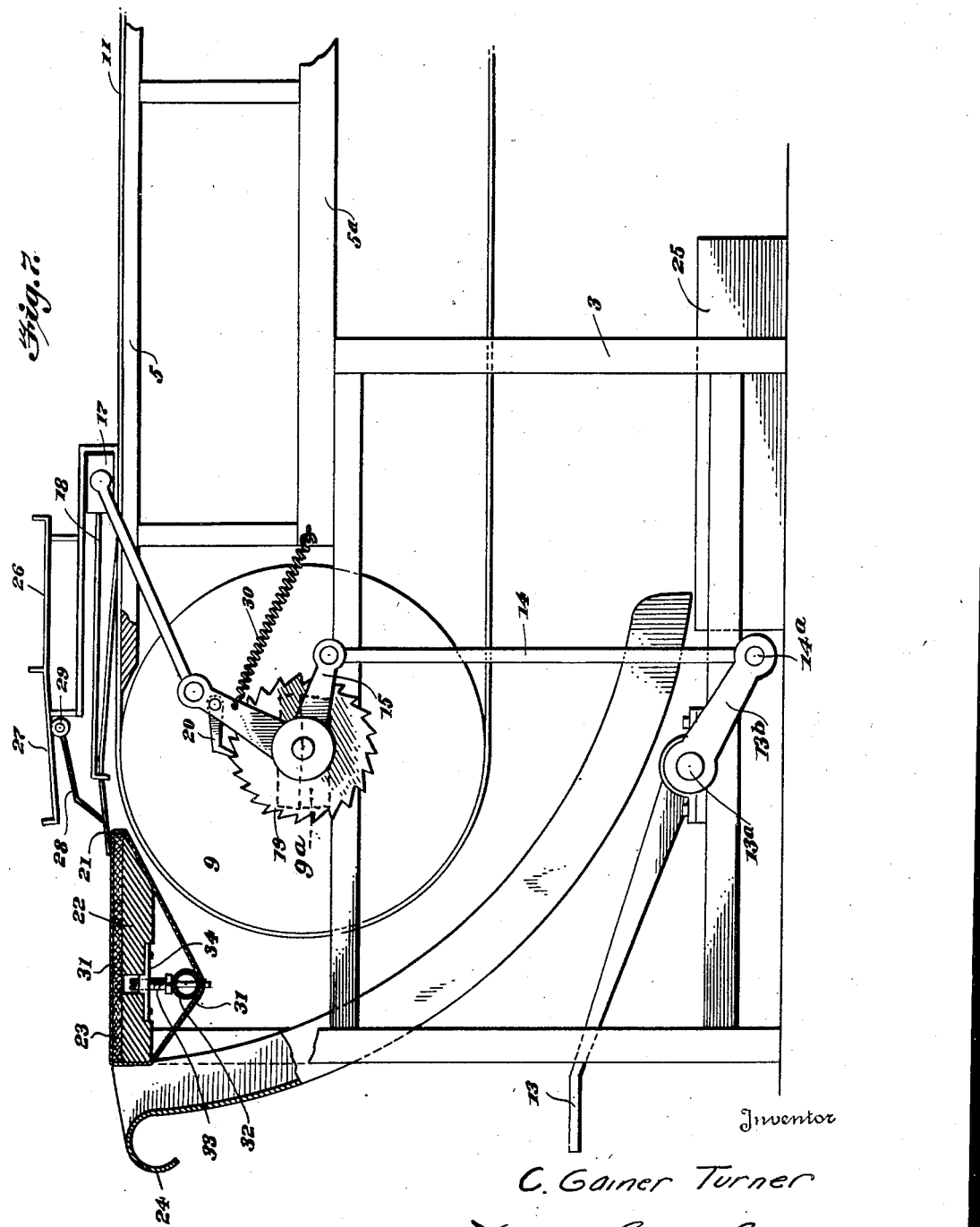
Inventor
C. Garner Turner
By Dorsey Cole & Garner
Attorneys Patented Dec. 24, 1940

2,226,084

UNITED STATES PATENT OFFICE 2,226,084

DOUGH WORKING, CONVEYING, AND CUTTING TABLE

Charles Gainer Turner, Atlanta, Ga.

Application February 8, 1939, Serial No. 255,313

12 Claims. (Cl. 107—4)

This invention relates to a combined dough working, conveying and cutting table and is particularly directed to a table for the efficient manufacture of what is known in the baker's trade as butter biscuits.

That the advantages of this invention may be better understood, I will outline the method and simple mechanical means generally used in commercial bakeries in making biscuits of the kind mentioned above.

The common practice to-day in making butter biscuits, is to pass through a rolling machine, which is known in the trade as a brake or sheeter, properly prepared dough, which machine rolls the dough in a sheet approximately twice the width and of the thickness of the sheet in its final form when cut into individual blanks. After the dough has passed through the brake or sheeter, it is spread upon a work table and one-half of the upper surface of the sheet of dough has applied thereto butter or some vegetable oil. The dry portion of the sheet is then folded over the buttered half of the sheet and the dough is again passed through the brake or sheeter, which machine rolls it to a width and a thickness slightly in excess of the thickness that the biscuit blanks made from the sheet should be. The sheet of dough is then placed on a work table and rolled to its final thickness and smoothness with an ordinary hand rolling pin. Thereafter, an experienced hand takes one side or end of the dough sheet and flips it up and down away from the work table, which movements entrap air between the bottom surface of the dough sheet and the top of the table. The entrapped air relieves friction between the sheet of dough and the top of the table and permits the dough to relax from internal strains therein. The sheet of dough is then dusted with flour after which it is cut into biscuit form with an ordinary biscuit cutter. Following the cutter, whose function it is to separate the sheet of dough into blanks, there comes a second operator who carries a pan and picks up by hand the individual biscuit blanks one at a time and places them in the pan. The pan with the biscuit blanks arranged therein is then passed into a proofing chamber and thereafter in proper time to the oven for baking. After the baking, the biscuits are delivered to the wrapping tables to be packaged for delivery to the trade. It is obvious that the above old method of manufacturing biscuits is awkward, slow, expensive and unsanitary. It is also evident that due to the sensitiveness of dough to heat changes and to handling, it is impossible to produce biscuits of uniform texture and size.

My invention which overcomes the objections outlined in describing the method now in use, does not involve the rolling out or the buttering of the dough sheet, but has to do with a quick transfer of the prepared sheet from the working end of the table to the cutting section of the table by mechanical means, and a mechanism for slowly feeding the sheet to a position where it is cut into blanks. The transfer and movement of the prepared dough sheet are done in such a manner as not to injure or distort the sheet in any way and at the same time is accomplished in such a manner as to relieve the internal strains within the dough. The invention contemplates a fast mechanical transfer of the sheet of dough on belts from the working end of the table to a cutting table by a drive which allows the belt forming the surface of the work table, and the belt forming the moving surface of the take-off table to move at the same speed, and mechanical means for moving the take-off belt only, so as to deposit the dough to the cutting table, while the belt forming the surface of the work table is idle and free. This allows the working end of the table to be utilized in preparing a new batch of dough while the previous prepared sheet of dough is being separated into blanks.

Within the convenient reach of the operator, who stands at the end of the dough take-off table adjacent the cutting table and cuts the dough into blanks, are means for controlling the movements of the surface of the work table and the surface of the take-off table, as will hereinafter be described in detail. In the layout shown in the drawings forming part of this application, I contemplate that the sheet of prepared dough be cut by a manually operated cutter, in which the dough blanks are retained until they are transferred to the proofing pans. A dough cutter and panning device of the above type is shown in full and claimed in my co-pending application Serial No. 253,901, filed January 31, 1939. From what has heretofore been said, it is evident that the dough products made by my machine are not touched by human hands from the time the sheet of dough is deposited on the work table until the baked articles are placed on the wrapping table for packaging.

In the drawings:

Figure 1 is a vertical section showing my complete dough working, conveying and cutting table.

Figure 2 is a plan view thereof.

Figure 3 is an end view of same at the cutting table end thereof.

Figure 4 is an enlarged elevation on one side of the take-off table showing a part of the mechanism for furnishing power to the take-off table.

Figure 5 is an end view, partially in section, of the mechanism for advancing the dough from the take-off table to the cutting table.

Figure 6 is a top plan view at the same end.

Figure 7 is an enlarged view of the left end of the apparatus shown in Figures 1 and 2, illustrating the cutting table and the take-off table and mechanism associated therewith.

In Figures 1 and 2, 1, 2 and 3 are supporting frames for the work table 4 and the take-off table 5. The work table and the take-off table are rectangular frames 4ᵃ and 5ᵃ resting on and supported by the supporting frames 1, 2 and 3. Mounted for revolution in the top of the supporting frames 1, 2 and 3, on a plane level with the top of the frames 4ᵃ and 5ᵃ forming the work and take-off tables are belt pulleys 6, 7, 8 and 9. These belt pulleys 6, 7, 8 and 9 have shafts which are housed and mounted in bearings 6ᵃ, 7ᵃ, 8ᵃ and 9ᵃ. An endless belt 10, the under surface of the upper run of which comes in contact with the top of frame 4ᵃ, is mounted on the pulleys 6 and 7, thus forming a movable top for the work table. The work table 4 has an extension 4ᵇ on one side thereof, the top of said extension being level with the top of the endless belt 10, thus enlarging the work surface of the table. An endless belt 11 is mounted for movement in a manner like the endless belt 10 over the frame 5ᵃ, the upper surface of said belt forming the conveying or take-off table. The endless belts 10 and 11 are made of canvas or are of that type known in the trade as a baker's rubber sanitary belt and preferably about 20 inches wide. The tension of the belt 10 is adjusted through the bearings 6ᵃ of the pulley 6, while the tension on the take-off belt 11 is adjusted through the idler pulley 11ᵃ. On the top of the supporting frame 2 between the belt pulleys 7 and 8 is bridge 12. The upper dough supporting surface of the bridge is on the same plane as the top surface of the upper run of belts 10 and 11.

Mounted in the supporting frame 3 on which rests one end of the frame 5ᵃ is a mechanism for advancing the prepared sheet of dough to the cutting table as needed, after the same has been conveyed to the belt 11 from the dough working position. This mechanism comprises a foot lever 13 rigidly attached to a rod 13ᵃ, said rod being mounted in bearings on each side of the supporting frame 3. The rod 13ᵃ has affixed thereto at each end, outside of the bearings for said rod, arms 13ᵇ. Attached to each arm 13ᵇ by pins 14ᵃ are links 14. Loosely mounted on the shaft 9ᵇ of the pulley 9 on the outside of the supporting frame 3 are rocker arms 15 to one end of which is connected the links 14. Connected to the other end of each rocker arm are links 16 having a loose connection with the ends of cross-heads 17. The cross-heads 17 rest and move on the top of the frame 5ᵃ on each side of the take-off belt 11. Attached to and movable with the cross-heads 17 are a pair of driving arms 18 connected to each side of the thin metal plate 21. This metal plate 21 is of the same width as the take-off belt 11 and has its under surface in contact with the belt 11. This metal plate acts as a feed plate in supporting the dough and feeding it from the belt 10 on to the surface of the cutting table. On one side of the shaft 9ᵇ of the pulley 9 is firmly attached a ratchet wheel 19. Connected to the rocker arm 15 on the same side of the table as the ratchet wheel 19, between the pivot of the rocker arm on the shaft 9ᵇ and the link 16, is a ratchet 20 to engage the teeth of the ratchet wheel 19.

In the rear of the structure and in line and on a plane with the top of the take-off belt 5, is a cutting table 22. This cutting table is covered with a pad 23 and canvas cover 31 in the form of a section of tubing, which will be hereinafter described in detail. Directly in the rear of the cutting table and in a direct line with the take-off table is the mouth of the hopper 24, into which automatically the scrap dough is pushed. The hopper 24 terminates on a box or bin 25 in which is collected the scrap dough to be returned to the dough brake and mixed with additional dough and rolled again in sheet form. On the extreme top of the supporting frame 3 is a rack for holding pans to receive cut biscuit blanks. The pans to be used are stacked in that section of the rack designated as 26, while the pan being filled with biscuit blanks is placed in the section 27 of the rack. Directly below the pan rack is a shaft 29 extending across and over the driving arms 18. Pivotly mounted on the shaft 29 is a gripper plate 28 which is of the same width as the take-off belt 10 and feed plate 21. This gripper plate 28 is mounted so that the lower edge of the same will engage the dough on the feed plate 21 and hold the same when the feed plate is moved back under the dough to a new position. Attached to the supporting frame 3 and to one of the rocker arms 15 is a coiled spring 30 of sufficient strength to cause the foot pedal 13 to return to the up position and the feed plate 21 to retract from under the sheet of dough to a new position.

The cutting table 22, which is directly in the rear of and on a plane with the top take-off frame 5ᵃ is covered with a pad 23, which in turn is covered with a canvas cover 31. This cover 31, on which the cutting edges of the dough cutter come in contact on each cutting operation, is a section of canvas tubing, of sufficient size to completely encircle the cutting table proper 22 and the padding 23 thereon. Mounted on each side of the cutting table 22 on the lower side thereof, are threaded plates 34, into each of which the slotted bolts 33 are screwed. Bridging the two bolts 33 is a tube 32 having holes therethrough of sufficient size to accommodate the reduced heads of the bolts 33.

By the position of the two bolts 33 and the tightening tube 32, the taughtness of the canvas cover of the cutting table is adjusted. By using a section of canvas tubing and the tightening and holding means described above, at least three different surfaces for the cutting table can be supplied by shifting the position of the canvas tubing. In practice I have found that two layers of three-ply canvas belting make an ideal padding for the cutting table and that a very satisfactory cutting pad cover is a section of tubing of No. 4 duck. A cover of this type changed through the three cutting positions will protect the padding during two months of steady use. This padding and cover, I find, materially prolongs the life of the sharpened edges of the blank cutters.

In the bottom of the supporting frame 2 is an electric motor 35, governed by the manually operated switch 35ᵃ located on the supporting frame 3 in a convenient position for the operator of the cutter. The power of the motor 35 is transmitted by belt 36 to the driving pulley 37. The shaft 37ª for the pulley 37 is mounted in bearings on the supporting frame 2. Securely attached to the shaft 37ª on the outside of the support frame 2 is a pinion gear 38 which meshes with the gear 39 attached to the drive shaft 40 of the belt pulley 7, which pulley carries one end of the belt forming the work section of the table. On the other side of the work table and attached to the drive shaft 40 is a sprocket wheel 41. The driven shaft 47 of the take-off pulley 8 extends past the supporting frame 2 and has attached to said end outside of the bearing for the shaft a ratchet wheel 45. A sprocket wheel 43 encircling the ratchet wheel, and a pawl 46 is mounted in the sprocket wheel and forms a loose connection between the same and the ratchet wheel 45. On the outer end of the shaft and attached thereto is a collar 44 for holding the above over-riding drive in position. Both sprocket wheels 41 and 43 are identical in size and in the number of teeth and are connected together by chain 42.

The above construction allows the motor 35 to drive both belts 10 and 11 in the same direction and at the same speed, but also allows the take-off belt 11 to move independently of the work belt 10 when the foot pedal 13 is operated. This independent movement of the take-off belt 11 is accomplished by the downward movement of the foot pedal 13 and the direct connection therethrough to the belt pulley 9, over which the take-off belt 11 travels.

The detail operation of the dough working and handling machine follows:

A sheet of dough having been worked upon and being ready for the cutting operation, is placed on the belt 10 forming the top of the work table. The electric switch 35ª, which is in convenient reach of the operator of the cutting and panning device is closed, starting the electric motor 35. Through the mechanism above described, power will be transmitted from the electric motor 35 to the endless belts 10 and 11 in unison. The leading end of a sheet of dough moves from off the belt 10 on to the bridge 12 and from there on to the take-off belt 11 and just before the approaching end of the sheet of dough reaches the feed plate 21, the electric switch is opened, thus causing the motor to stop, which in turn stops the forward movement of the belt 11 carrying the sheet of dough. The operator now presses the foot lever 13, which in turn causes the take-off belt 11 and the feed plate 21, carrying the dough, to move rearward until the front edge of the feed plate moves across the top surface of the cutting table 22, at which time the operator releases the foot lever 13. The influence of the spring 30 causes the feed plate to quickly snap back under the advance end of the sheet of dough and the foot lever 13 to assume its original position. The operator presses again on foot lever 13 a sufficient number of times to cause the dough to be moved across to the outside edge of the cutting table. The tendency of the sheet of dough to be carried back on itself by the feed plate 21, when the same is moved to a new position under the sheet of dough, is overcome by the gripper plate 28, which holds the sheet against such movement but allows the same to advance with the plate 21. The operator then cuts that portion of the dough which is supported on the cutting table, into biscuits and places them with the cutter into a pan located in the rack 27. The foot lever is again pressed and the sheet of dough is again advanced to cover the cutting table. The advance of the uncut dough across the cutting table pushes the scrap dough, left from the previous cutting, off the cutting table into a hopper 24 where it passes on to the scrap box 25. This operation of cutting and the foot lever advancement of the dough to present new sections to be cut is continued until there is none of the sheet left on the take-off belt. A second sheet of dough which was prepared on the work belt during the cutting of the first sheet of dough is advanced to the cutting position in the manner indicated for the first sheet.

It should be mentioned here that the gripper plate 28 which serves to prevent any backward movement of the sheet of dough, stops this movement and causes the extended or exposed portion of the sheet of dough to become slightly compact, in a backward manner, due to the friction between the under side of the dough and the feeder plate 21 as the latter returns from its extended or advanced position back to its normal position under the sheet of dough. This holding and compacting of the sheet of dough will neutralize any remaining strains left within the dough during the preparation and rolling of the same. Strains in a sheet of dough are most pronounced in the direction in which the sheet is rolled, which naturally is lengthwise of the sheet, as this is the convenient way of working. If strains remain in the sheet of dough and are not neutralized, the blanks cut therefrom will be perfectly round after cutting, but in a few moments thereafter will assume a very decided oblong shape. In making biscuits, one of the great problems is to obtain biscuit blanks that will remain perfectly round throughout the proofing and baking process.

From the aforegoing description of my complete dough working, conveying and cutting table, it is evident that I have perfected a mechanism which will transfer a rolled sheet of dough from the working table to the cutting table in perfect condition, free of internal stresses and strains.

What is claimed is:

1. In a dough working, conveying and cutting table, the combination of a dough working section, a stationary cutting table, and a take-off or conveying section, the upper surfaces of the work section and the take-off or conveying section being movable, with means for moving said movable surfaces in unison, with other independent means for moving only the surface of the take-off section of the table.

2. In a dough working, conveying and cutting table, the combination of a dough working section, a stationary cutting table, a take-off or conveying section, the upper surfaces of the work and take-off sections of the table being movable, a feed plate the lower surface of which is in contact with the movable upper surface of the take-off section, means for moving the surfaces of the work and take-off sections in unison to transfer the dough thereon to the moving surface of the take-off section with independent means for moving only the surface of the take-off section to deposit a portion of the sheet of dough on to the feed plate.

3. In a dough working, conveying and cutting table, the combination of a dough working section, a stationary cutting table, a movable feed plate and a take-off or conveying section interposed between the cutting table and the working section, the upper surfaces of the working and take-off or conveying sections being movable, means for moving the said upper surfaces of the work and take-off sections in unison, and independent means for moving only the upper surfaces of the take-off table and the feed plate towards the cutting table.

4. In a dough working, conveying and cutting table, the combination of a dough working section, a cutting table, a movable feed plate and a take-off or conveying section, both the feed plate and conveying sections being interposed between the cutting table and the working section, the upper surfaces of the working and take-off or conveying sections being movable, means for moving said upper surfaces of the working and take-off or conveying sections in unison, and independent means for moving only the surface of the take-off table and the feed plate bodily towards the cutting table.

5. In a dough working, conveying and cutting table, the combination of a dough working section, a cutting table, a movable feed plate and a take-off or conveying section, said movable feed plate being above and in contact with the upper surface of the conveying section, with means for moving the feed plate towards the cutting table and the surface of the conveying section towards the feed plate.

6. In a dough working, conveying and cutting table, the combination of a dough working section, a cutting table, a movable feed plate, and a take-off or conveying section, said movable feed plate being above and in contact with the upper surface of the conveying section, with means for moving the feed plate over a portion of the take-off section of the table towards the cutting table and the take-off section of the table towards the cutting table, both of said movements occurring at the same time and being of the same amplitude.

7. In a dough working, conveying and cutting table, the combination of a cutting table, a movable feed plate, a take-off or conveying section, and a dough gripping device, said movable feed plate being interposed between the cutting table and the take-off section of the table and movable towards the cutting table but always in contact with the upper surface of the take-off section of the table, a gripper plate pivotally mounted above the feed plate to engage the dough thereon and to prevent the dough from following the feed plate when the latter returns under the dough from the cutting table.

8. In a dough cutting table, the combination of a base, padding thereon, and a cover in the form of a section of endless belting, with means for tightening the section of endless belting around the base and padding so as to form a cover for the padding on the cutting table.

9. In a dough working, conveying and cutting table, the combination of a dough working section, a stationary cutting table, a take-off or conveying section, the upper surfaces of the work section and the take-off or conveying section being movable, with means for moving said movable surfaces in unison, with other independent means for moving only the surface of the take-off section of the table, and means adjacent the cutting table and within the reach of the operator at such table for controlling the movement of the surfaces in unison and the independent movement of the surface of the take-off section of the table.

10. In a dough working, conveying and cutting table, the combination of a dough working section, a stationary cutting table, a take-off or conveying section, the upper surfaces of the work section and the take-off or conveying section being movable, with means for moving said movable surfaces in unison, with other independent means for moving only the surface of the take-off section of the table, and means adjacent the cutting table and within reach of the operator at such table for controlling the movements of the said surfaces in unison and independent control means for controlling the movement of the surface of the take-off section of the table.

11. In a dough conveying and cutting table, the combination of a cutting table, a movable feed plate and a take-off or conveying section, said feed plate being located above and in contact with the upper surface of the conveying section and in contact with the lower surface of the dough transported by the conveying section, means for moving the feed plate toward and away from the cutting table characterized by the fact that the movement of the feed plate toward the cutting table serves to advance the dough thereto and its movement in a reverse direction and away from the cutting table tends to relieve the dough of any tension present therein.

12. In apparatus for producing biscuits, the combination of a cutting table, a movable feed plate, a take-off or conveying section and a gripper plate engaging the upper surface of the dough conveyed to the cutting table, said feed plate being located above and in contact with the upper surface of the conveying section and in contact with the lower surface of the dough transported by the conveying section, means for moving the feed plate toward and away from the cutting table characterized by the fact that the movement of the feed plate toward the cutting table serves to advance the dough thereto, the gripper plate serves to hold said dough in said advanced position and the movement of the feed plate in a reverse direction and away from the cutting table tends to relieve the dough of any tension present therein.

CHARLES GAINER TURNER.